United States Patent [19]

Pilatowicz

[11] 4,227,601
[45] Oct. 14, 1980

[54] CENTRIFUGAL CLUTCH

[75] Inventor: Edward J. Pilatowicz, Los Angeles, Calif.

[73] Assignee: McCulloch Corporation, Los Angeles, Calif.

[21] Appl. No.: 857,290

[22] Filed: Dec. 5, 1977

[51] Int. Cl.³ .............................................. F16D 43/18
[52] U.S. Cl. .............................................. 192/105 BA
[58] Field of Search ............. 192/105 BA, 103 B, 76, 192/105 BB, 105 CD; 267/28, 168

[56] References Cited

U.S. PATENT DOCUMENTS

| | | | |
|---|---|---|---|
| 1,584,803 | 5/1926 | Pohl | 267/168 |
| 1,873,561 | 8/1932 | Else et al. | 192/105 BA |
| 1,926,483 | 9/1933 | Hatcher | 192/105 BA |
| 2,730,216 | 1/1956 | Miller | 192/105 BA |
| 3,367,464 | 2/1968 | Fullerton et al. | 192/105 BA |

FOREIGN PATENT DOCUMENTS

| | | | |
|---|---|---|---|
| 898164 | 4/1972 | Canada | 192/76 |
| 1396803 | 3/1965 | France | 267/168 |
| 252773 | 7/1970 | U.S.S.R. | 192/105 BA |

*Primary Examiner*—George H. Krizmanich
*Attorney, Agent, or Firm*—Kenway & Jenney

[57] ABSTRACT

A centrifugal clutch assembly having a resilient restraining means for providing a radially inwardly directed restraining bias to each of a plurality of clutch shoe members is disclosed. The restraining means comprises a coiled spring member circumferentially surrounding and in contact with each clutch shoe member and a rod spring member extending substantially a complete extent of and enclosed within the coil spring member. A coil spring member and the rod spring member each contribute to the radially inwardly directed bias whereby the idle range of the clutch mechanism is increased over the use of either spring member by itself. In this way, overstressing of a spring member is eliminated.

6 Claims, 7 Drawing Figures

U.S. Patent    Oct. 14, 1980    4,227,601
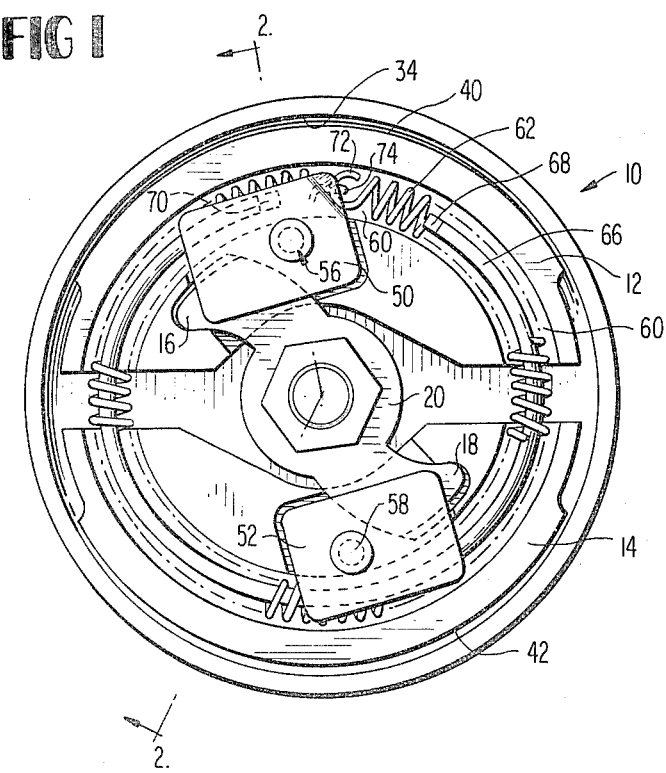
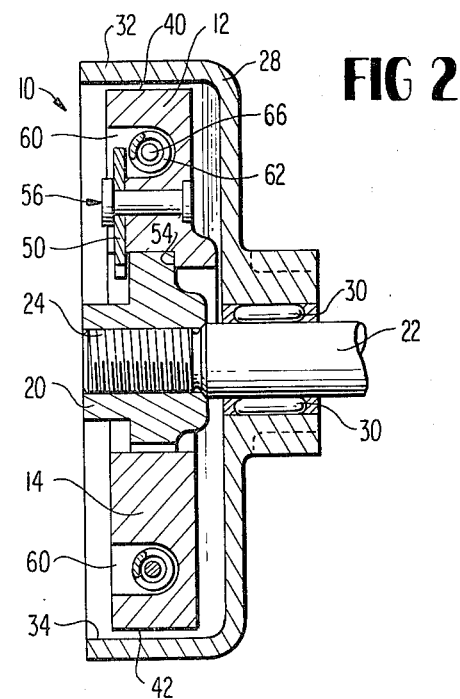
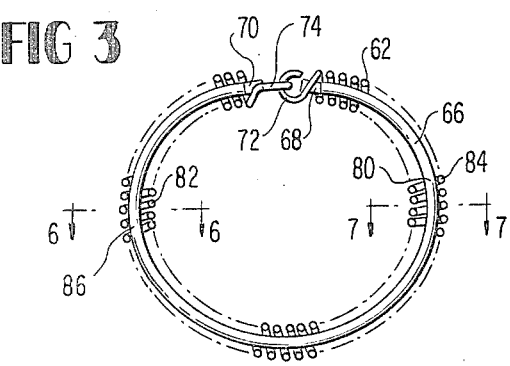
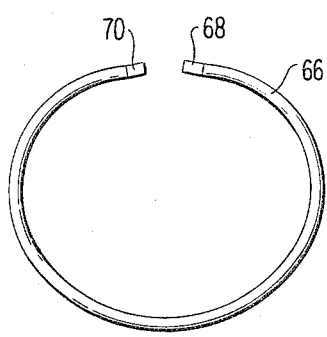
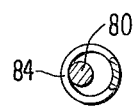
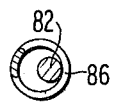
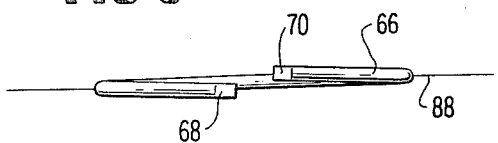

CENTRIFUGAL CLUTCH

The invention relates generally to centrifugal clutches and in particular, to a centrifugal clutch mechanism having a circumferential restraining spring assembly.

BACKGROUND OF THE INVENTION

Centrifugally actuated clutches are well known for driving many different mechanisms. A particularly useful class of centrifugal clutches has an idle region in which the clutch shoes are restrained out of contact with a driven clutch drum over a desired range of drive motor rotational speed. Typically, the major factors determining the idle range are the center of gravity and/or mass of the clutch shoes, connection of the clutch shoe to the driven supporting structure, and the nature and strength of the generally inwardly directed restraining forces.

Typically, in applications wherein a larger idle range is necessary, either the structure or mass of the clutch shoes or the strength (usually the spring constant) of the clutch shoe restraining force is changed. Thus by either reducing the effective centrifugal mass of the clutch shoes or by increasing the restraining force, a larger rotational speed is required to effect shoe movement, and a larger idle speed range is obtained. In many applications, however, it is impossible or undesirable to alter the structure of the clutch shoe assembly and hence it is only the restraining force which can be changed. However, the restraining force is generally provided by spring materials, which can be used only over certain well known ranges, past to top limits of which, they become overstressed and hence unreliable.

A particularly, commercially successful, construction of the centrifugal clutch mechanism is one which uses a circumferential coiled spring to provide the restraining force. These mechanisms have been the subject of many patents and various means have been devised for either improving the coiled spring construction or replacing it with, for example, solid springs such as those described and claimed in Frederickson, U.S. Pat. No. 3,768,611, issued Oct. 30, 1973. Although these systems have in general proven to be of considerable commercial impact, they too meet serious obstacles as the idle range is increased.

It is therefore a principal object of the invention to provide a centrifugal clutch mechanism having an increased idle range without the inherent disadvantages of spring material overstressing. Other objects of the invention are to provide a centrifugal clutch mechanism which is reliable, simple in construction, substantially rattle-free, strong, and relatively low in manufacturing cost.

A further object of the invention is to provide a centrifugal clutch mechanism in which the component parts are positionally stable.

SUMMARY OF THE INVENTION

The invention features a centrifugal clutch having a driving member, a driven member including a clutch drum, a plurality of centrifugally responsive clutch shoe members, and a resilient restraining means. The centrifugally responsive clutch shoe members are operatively supported by the driving member for movement of a frictional surface of the clutch members into and out of engagement with the clutch drum. The resilient restraining means applies a radially inwardly directed bias to the clutch shoe members and comprises a coiled spring member extending around a circumference of said drum, inwardly from said clutch drum, and in contact with each clutch shoe member, and a rod spring member extending substantially a complete extent of and enclosed within the coiled spring member. Thereby, the coiled spring member and the rod spring member each contribute to the radially inwardly directed bias and the idle range of the clutch is increased over the use of either the coil spring or the rod spring by itself.

In preferred embodiments of the invention, the rod spring has an oval-like configuration and contacts radially outward portions of the coiled spring at at least two spaced apart positions. In a further preferred embodiment, the rod spring has a helical configuration and contacts the coiled spring further at least at each rod spring end. Each of these variations in the rod spring configurations reduces the rattle between the spring member.

In yet a further aspect of the invention, the rod spring ends define a gap in which the ends of the coiled spring are connected; and the ends of the rod spring are canted, whereby creeping of the rod spring within the coil spring is reduced.

DESCRIPTION OF THE DRAWINGS

Other objects, features, and advantages of the invention will appear from the following description of a preferred embodiment taken together with the drawings in which:

FIG. 1 is a plan view of a centrifugal clutch mechanism according to the invention;

FIG. 2 is a cross-sectional view along lines 2—2 of FIG. 1;

FIG. 3 is a plan view of the resilient restraining means;

FIG. 4 is a plan view of the rod spring member;

FIG. 5 is a plan view of the rod spring member;

FIG. 6 is a cross-sectional view along lines 6—6 of FIG. 3; and

FIG. 7 is a cross-sectional view along lines 7—7 of FIG. 3.

DESCRIPTION OF A PREFERRED EMBODIMENT

Referring to FIG. 1, the centrifugal clutch assembly 10 has a pair of clutch shoe members 12 and 14 slideably mounted and supported on protruding portions 16 and 18 respectively of a rotating driving member 20. Member 20 is secured on a rotating driving member shaft 22, by a threaded connection 24 (FIG. 2). Surrounding the clutch shoe and driving member is a driven member 28 journalled for rotation about shaft 22 on bearings 30. Driven member 28 has a rim portion, clutch drum 32, having an inside surface 34 directed parallel to the axis of rotation of shaft 22. The radius of curvature of outside surface portions, surfaces 40, 42, of shoe members 12 and 14, is the same as the radius of curvature of the inside rim surface 34. The shoe members are secured against translation in the direction of the axis of rotation of shaft 22 by the protruding portions 16, 18 which are securely held by plate members 50, 52 against the clutch shoe walls (only wall 54 is shown (FIG. 2)). Members 50, 52 are secured against shoes 12 and 14 by fasteners 56, 58 respectively.

Shoes 12 and 14 are urged in a radially inward direction by a resilient restraining means seated in circumferential groove 60 in each clutch shoe member. The resilient restraining means comprises a coiled spring 62 (a garter spring) connected at its ends to form a continuous circumferential spring member and enclosing a rod spring member 66 which extends substantially the entire extent of spring member 62. The rod spring member 66 has spaced apart canted ends 68 and 70 to reduce spring creeping.

Referring to FIG. 3, the illustrated resilient restraining means comprises the coiled spring member 62 which extends completely around and encloses the rod spring member 66. The coiled spring, which is preferably a garter spring, has at each end hook members 72, 74, respectively, which are connected in an operational relationship, in the gap between rod spring ends 68,70, to provide a predetermined tensioning of the coiled spring member.

The rod member which is shown without the coiled spring member in FIG. 4 has a somewhat flattened oval-like shape, so that, referring to FIG. 4, its extent in the vertical direction is less than its extent in the horizontal direction. As a result, when coiled spring member 62 is threaded around rod 66, the right and left hand extreme portions 80, 82 of the rod member contact radially outward portions 84, 86 (FIGS. 6 and 7) of the spring member 62. As a result, the radial position of the coiled spring member relative to the rod member is substantially fixed and rattle between the two spring members is significantly reduced.

To even further reduce rattle, rod spring member 66 has a slightly helical configuration, FIG. 5, so that one end 70 of the spring member rises slightly above and the other end 68 is slightly below, a plane 88 of average mass of the coiled spring member. In this manner, the canted ends 68, 70 contact and further prevent rattle with the coiled spring member. The canted ends also provide easier threading of the coiled spring member 62 onto the rod spring member and further provide a resistance to creeping of rod spring member 66 relative to the coiled spring member 62.

In operation, the resulting spring effect of having the two substantially coaxial spring members is to add their effective spring constants to provide a greater restraining force against the radially outward movement of clutch shoes 12 and 14. Thus, the centrifugal force developed as the clutch shoes are rotated about the axis of rotation of shaft 22 by extending members 16, 18 and support member 20 must be increased to overcome the restraining forces, and a greater idle range is achieved.

In addition, the two coaxial spring members combine to provide a restraining means having greater capabilities and flexibility than the use of the springs in a non-coaxial structure.

MAJOR ADVANTAGES OF THE INVENTION AND UNOBVIOUSNESS

The centrifugal clutch according to the invention thus advantageously provides a resilient restraining means having a higher effective spring constant than available by any of the prior art single spring systems. Each of the separate spring restraining members is further not subject to overstressing. Additionally, the resilient restraining means advantageously prevents creeping of one spring member relative to the other. The particular union of a coiled spring and a solid spring member advantageously provides strength characteristics and superior stability and reliability characteristics unavailable with comparable prior art configurations.

The particular construction described and claimed herein further provides the advantage of substantially rattle-free operation which is generally unavailable in those configurations wherein a plurality of contiguous coil springs or a plurality of contiguous rod spring members are used. Thus, the claimed invention uniquely provides advantages and desirable operating characteristics unavailable through the use of either of the spring members separately and further provides a functional result greater than what would be expected by merely combining the spring members.

The prior art is replete with examples of either circumferential spring elements or a plurality of C-shaped spring members used in connection with a centrifugal clutch mechanism. Typical examples of systems having a circumferential coiled spring, such as a garter spring, with or without a retaining means to hold a spring in place, (the retaining means generally passing through the interior of the coil spring member but not having spring-like qualities itself), are, for example, Moore, et al, U.S. Pat. No. 2,947,399, issued Aug. 2, 1960, Brooks, U.S. Pat. No. 3,824,867, issued July 23, 1974, Thomas, U.S. Pat. No. 2,180,217, issued Nov. 14, 1939, Peters, U.S. Pat. No. 3,313,169, issued Apr. 11, 1967, Libby, U.S. Pat. No. 1,841,613, issued Jan. 19, 1932 (with a resilient sheet material).

In addition to the prior art references noted above which relate to a coiled spring member which circumferentially surrounds the clutch shoe members, there are other references, such as Frederickson, U.S. Pat. No. 3,768,611, issued Oct. 30, 1973 (noted above), which describes a centrifugal clutch mechanism having a plurality of C-shaped rings circumferentially mounted about the clutch shoes to maintain the shoes in a retracted position when the driving member is within an idle range. Other references of a related, though different type, are for example Kimball et al, U.S. Pat. No. 2,243,565, issued May 27, 1941 (split rings 54), Savage, U.S. Pat. No. 2,902,128, issued Sept. 1, 1959, Giometti, U.S. Pat. No. 3,306,409, issued Feb. 28, 1967 and Selander, U.S. Pat. No. 2,572,528, issued Oct. 23, 1951.

There are in addition, a number of references in which a solid, rod shaped, retaining member is passed through the coiled spring member in order to provide a retaining function. The solid members do not, in these references, act as a spring member and do not contribute to the resilient restraining function. Typical of these references are Reed, U.S. Pat. No. 1,889,698, issued Nov. 29, 1932 (FIGS. 9 and 10), Hatcher, U.S. Pat. No. 1,926,483, issued Sept. 12, 1933, Reed, U.S. Pat. No. 2,028,951, issued Jan. 28, 1936, Reed, U.S. Pat. No. 2,029,339, issued Feb. 4, 1936, and Armstrong, U.S. Pat. No. 3,628,353, issued Dec. 21, 1971.

The references thus generally relate to various constructions of spring members useful in a clutch mechanism. Most, but not all, relate to centrifugal clutch systems. Nevertheless, despite the great proliferation of clutch related art, and in particular clutch related art wherein circumferential springs are used, the invention claimed herein is not suggested or disclosed in any of the cited references, which span a period of over forty years.

Other embodiments of the invention, including additions, subtractions, deletions, and modifications of the disclosed preferred embodiment will be obvious to those skilled in the art and are within the scope of the following claims.

What is claimed is:

1. A centrifugal clutch comprising
a driving member,
a driven member, said driven member including a clutch drum,
a plurality of centrifugally responsive clutch shoe members operatively supported by said driving member for movement of a friction surface of each said clutch member into and out of engagement with said clutch drum,
a resilient restraining means for applying a radially inwardly directed bias to the clutch shoe members, said resilient means comprising
a coiled spring member extending around a circumference of said clutch inwardly from said clutch drum and in contact with each clutch shoe member, and
a rod spring member extending substantially a complete extent of and enclosed within said coiled spring member,
said rod spring having at least a circumferential portion thereof spaced apart from an inner portion of said coiled spring,
said coiled spring and said rod spring each contribute to said radially inwardly directed bias, and
whereby the idle range for said clutch is increased over the use of the coiled spring or the rod spring by itself.

2. A centrifugal clutch comprising
a driving member,
a driven member, said driven member including a clutch drum,
a plurality of centrifugally responsive clutch shoe members operatively supported by said driving member for movement of a friction surface of each said clutch member into and out of engagement with said clutch drum,
a resilient restraining means for applying a radially inwardly directed bias to the clutch shoe members, said resilient means comprising
a coiled spring member extending around a circumference of said clutch inwardly from said clutch drum and in contact with each clutch shoe member,
a rod spring member extending substantially a complete extent of and enclosed within said coiled spring member,
said rod spring has an oval-like configuration, and said rod spring contacts radially outward portions of said coiled spring at at least two spaced apart positions,
said coiled spring and said rod spring each contribute to said radially inwardly directed bias, and
whereby the idle range for said clutch is increased over the use of the coiled spring or the rod spring by itself and rattle between said spring members is reduced.

3. A centrifugal clutch comprising
a driving member,
a driven member, said driven member including a clutch drum,
a plurality of centrifugally responsive clutch shoe members operatively supported by said driving member for movement of a friction surface of each said clutch member into and out of engagement with said clutch drum,
a resilient restraining means for applying a radially inwardly directed bias to the clutch shoe members, said resilient means comprising
a coiled spring member extending around a circumference of said clutch inwardly from said clutch drum and in contact with each clutch shoe member,
a rod spring member extending substantially a complete extent of and enclosed within said coiled spring member, and
said rod spring has a helical configuration and contacts said coiled spring at least at each rod spring end,
said coiled spring and said rod spring each contribute to said radially inwardly directed bias, and
whereby the idle range for said clutch is increased over the use of the coiled spring or the rod spring by itself and rattle between said spring members is reduced.

4. The clutch of claim 3, wherein said rod spring ends define a gap in which said coiled spring ends are connected.

5. The clutch of claim 4 wherein
said rod spring is canted at each end,
whereby creeping of the rod spring in the circumferential direction is reduced.

6. A centrifugal clutch comprising
a driving member,
a driven member, said driven member including a clutch drum,
a plurality of centrifugally responsive clutch shoe members operatively supported by said driving member for movement of a respective clutch member friction surface into and out of engagement with said clutch drum,
a resilient retaining means for applying a radially inwardly directed bias to the clutch shoe members, said resilient means comprising
a coiled spring member circumferentially surrounding and in contact with each clutch shoe member, and
a rod spring member extending substantially a complete extent of and enclosed within said coiled spring member, said rod member having a generally oval-like configuration in the plane of said coiled spring member and a helical configuration in a direction normal to the plane of the coil spring member, said rod spring contacting radially outward portions of the coiled spring at at least two spaced apart positions and ends of said rod spring member being canted,
whereby the coil spring and the rod spring members each contribute to said radially inward bias, the idle range of the clutch is increased over the use of the coil spring member by itself, rattle between the spring members is reduced, and relative spring creeping, between the spring members in the circumferential direction is reduced.

* * * * *